(12) United States Patent
Boubal et al.

(10) Patent No.: US 6,953,924 B2
(45) Date of Patent: Oct. 11, 2005

(54) METHOD FOR EXTRACTING AN ILLUMINATE ZONE FROM A PHOTOSENSOR MATRIX

(75) Inventors: Michel Boubal, Bourges (FR); Jean Michelis, La Crau (FR); Michel Dumas, Nimes (FR)

(73) Assignee: MBDA France, Paris (FR)

( * ) Notice: Subject to any disclaimer, the term of this patent is extended or adjusted under 35 U.S.C. 154(b) by 219 days.

(21) Appl. No.: 10/429,244

(22) Filed: May 5, 2003

(65) Prior Publication Data
US 2003/0209650 A1    Nov. 13, 2003

(30) Foreign Application Priority Data
May 6, 2002    (FR)    .................... 02 05623

(51) Int. Cl.$^7$ ............................. H01L 27/00

(52) U.S. Cl. .................... 250/208.1; 382/103; 348/169

(58) Field of Search ................ 348/169–175; 375/240.08, 240.09; 250/208.1, 214 R, 203.1–203.3, 250/203.6; 382/103, 106, 107, 201; 244/3.16; 356/4.01

(56) References Cited

U.S. PATENT DOCUMENTS

| | | | |
|---|---|---|---|
| 5,227,619 A * | 7/1993 | Vilaire et al. ............ | 250/206.2 |
| 5,430,290 A | 7/1995 | Merle et al. | |
| 5,973,310 A * | 10/1999 | Lunscher ................ | 250/203.1 |
| 6,003,810 A | 12/1999 | Roze des Ordons et al. | |
| 6,298,143 B1 | 10/2001 | Kikuchi et al. | |
| 6,636,634 B2 * | 10/2003 | Melikian et al. ............ | 382/217 |
| 2003/0067983 A1 * | 4/2003 | Lee et al. .............. | 375/240.08 |

FOREIGN PATENT DOCUMENTS

EP    0633457    1/1995

* cited by examiner

*Primary Examiner*—Stephone B. Allen
*Assistant Examiner*—Davienne Monbleau
(74) *Attorney, Agent, or Firm*—Stevens, Davis, Miller & Mosher, LLP

(57) ABSTRACT

A method for extracting an illuminated zone from a matrix of photosensors may include: (a) dividing the matrix into a plurality of search zones, (b) searching for the presence of an active photosensor in the search zones, (c) stopping the search as soon as an active photosensor is found in a search zone, and (d) further subdividing the first search zone determined to have an active photosensor into a plurality of search zones. Additionally the method may include repeating steps (b) through (d) until a search zone having only active photosensors is obtained.

6 Claims, 3 Drawing Sheets

METHOD FOR EXTRACTING AN ILLUMINATE ZONE FROM A PHOTOSENSOR MATRIX

FIELD OF THE INVENTION

The present invention relates to a method for extracting an illuminated zone from a matrix of photosensors of a light-detecting device, and a light-detecting device capable of implementing this method.

BACKGROUND OF THE RELATED ART

Such a light-detecting device, which normally comprises, as described for example in patent EP-0 633 457, a matrix of photosensors which are arranged in rows and in columns and which are each able to take one of two states, an active state when they are illuminated and an inactive state when they are not illuminated, is more particularly, although not exclusively, designed for detecting a very-short-duration laser pulse which is emitted in an ambient light environment of variable illumination, for example at a predetermined frequency.

By way of illustration, the laser pulse to be detected may be emitted by a laser source which is aimed at a target, for example a tank, in order to highlight it, so that it can be located by a weapons system, such as a missile, which is equipped with said light-detecting device and which is designed to destroy this target. To this end, said light-detecting device is for example associated with the homing head of the missile, has a fixed position on said missile and observes the space to the front of said missile. The information relating to the location of the target, which information is generated by this light-detecting device, is supplied to the homing head which uses it to guide the missile onto the target.

A major drawback concerning the use of such a light-detecting device for guiding a missile lies in the difficulty and in the considerable duration needed to extract the zone which is illuminated by the laser pulse from said matrix of photosensors, and to locate this zone on the matrix, so as to obtain information concerning the position of the target, which information is necessary for guiding the missile. Because of the high speed of the missile, it is essential for any change in position to be detected rapidly in order to be able to supply correction orders in time to the components driving said missile, so that it does not miss the target.

Now, to detect the position of a light spot, that is to say the position of the aforementioned illuminated zone, on the matrix of photosensors, it is known for the state (active or inactive) of each photosensor to be analyzed individually. Such an analysis, if it is implemented photosensor by photosensor, is very lengthy, and in any case too lengthy for the applications envisioned above, for which the information must be available very quickly.

Moreover, it is also known to use a logic OR gate of the "global OR" type over the entire matrix, which makes it possible to indicate whether at least one photosensor is in the active state on said matrix by simultaneous analysis of all the photosensors. However, such a "global OR" does not make it possible to identify the photosensor or photosensors which are activated, and therefore to locate them. Such a "global OR" does therefore not allow the rapid extraction of an illuminated zone from a matrix of photosensors.

SUMMARY OF THE INVENTION

The subject of the present invention is to overcome these drawbacks. It relates to a method for extracting, very quickly and reliably, an illuminated zone from a matrix of photosensors of a light-detecting device.

To this end, according to the invention, said method for extracting an illuminated zone from a matrix of photosensors of a light-detecting device, said matrix comprising a plurality of photosensors which are arranged in rows and in columns and which are each able to take one of two states, an active state when they are illuminated and therefore activated and a passive state when they are not illuminated and therefore inactivated, said illuminated zone corresponding to the set of activated photosensors, is noteworthy in that the following successive steps a) to c) are repeated:

a) a matrix field of said matrix of this light-detecting device is divided into a plurality of search zones together covering said matrix field, said matrix field corresponding to the entire said matrix during the first division;

b) said search zones are analyzed one after another in order to search for the presence of an active photosensor, the analysis of a search zone consisting in using an OR logic gate connected to all the photosensors of the search zone to collect, one after another, the states of all these photosensors of said search zone and to check overall if one of said states is an active state; and c) as soon as an active photosensor is found in a particular search zone, the search is stopped and this search zone, the size and the position on said matrix of which is known, is considered to be a new matrix field that can be reused if necessary in a new step a), said repetition of steps a) to c) being continued until obtaining a matrix field comprising only active photosensors, this matrix field, the size and the position on the matrix of which are known, then corresponding to said illuminated zone to be extracted.

By virtue of the analysis according to the invention of the matrix of photosensors, which consists:

in using an OR logic function of "global OR" type, not just over the entire matrix, but over search zones of variable size and position, it being possible for the size of a search zone to vary from the size of an individual photosensor to the size of the entire matrix; and in continuing the search only over illuminated search zones (of which at least one photosensor is active), the unilluminated search zones no longer being included; and in forming search zones of ever decreasing size, convergence onto the illuminated zone of said matrix occurs very quickly.

Thus, by virtue of the invention, an illuminated zone in a matrix of photosensors of a light-detecting device is quickly and reliably extracted.

Within the scope of the present invention, a matrix field is divided into any number of search zones of identical or different sizes, which number may be variable.

In a first embodiment, in step a), a matrix field is divided each time into four search zones of identical sizes.

In a second embodiment, in step a), a priority search zone is formed each time by dividing up the matrix field, which zone is centered on an estimated position of the illuminated zone and which is then analyzed as a priority in step b).

Moreover, in a particular embodiment, a search zone being defined by its end positions on a first axis representing the columns, and by its end positions on a second axis representing the rows:

firstly, the steps a) to c) are repeated until obtaining the end positions of the illuminated zone on said first axis; and secondly, the steps a) to c) are repeated until obtaining the end positions of the illuminated zone on said second axis.

The present invention also relates to a light-detecting device, comprising a matrix of photosensors which are arranged in rows and in columns and which are each able to take one of two states, an active state and an inactive state.

According to the invention, said light-detecting device is noteworthy in that it further comprises a row selection cell and a column selection cell which are associated with said matrix and which are able to extract an illuminated zone from said matrix by implementing the aforementioned method.

BRIEF DESCRIPTION OF THE DRAWINGS

The figures in the appended drawing will make it easy to understand how the invention can be embodied. In these figures, identical references denote similar elements.

DETAILED DESCRIPTION OF THE INVENTION

Figure 1:
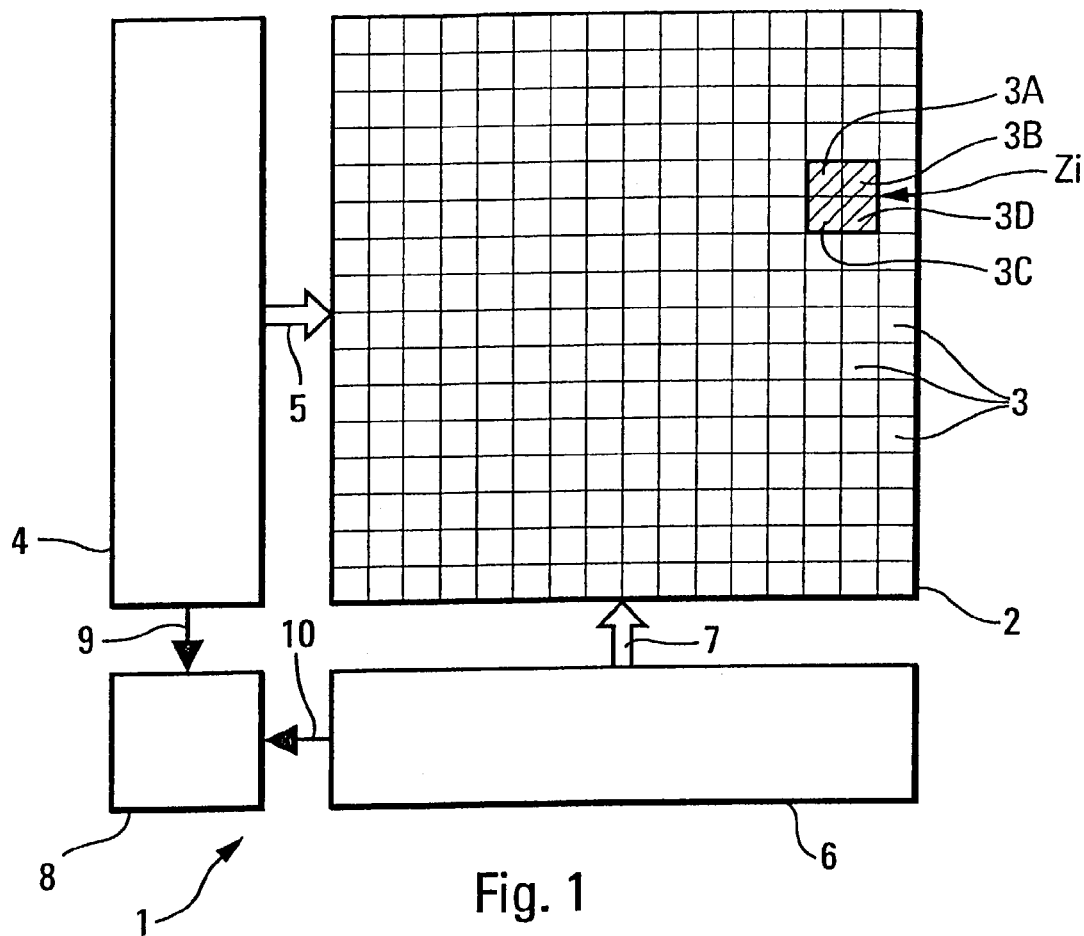
FIG. 1 is the block diagram of a light-detecting device according to the invention.

The device 1 according to the invention and shown schematically in FIG. 1 is designed to detect a light signal, in particular a laser pulse.

Said device 1 is of the type comprising a matrix 2 of photosensors 3 which are arranged in rows and in columns and which are each able to take one of two states, an active state when they are illuminated and therefore activated, and a passive state when they are not illuminated and therefore not activated. This matrix 2 is illuminated by a light ray on an illuminated zone Zi corresponding to the formed set of sensors 3A, 3B, 3C, 3D which are therefore activated.

According to the invention, said light-detecting device 1 further comprises a cell for selecting rows 4 which is connected via a row bus transmission link 5 to the matrix 2 and a cell for selecting columns 6 which is connected via a column bus transmission link 7 to said matrix 2, said cells 4 and 6 being able to extract said illuminated zone Zi from the matrix 2, by implementing the method according to the invention which will be specified below.

The device 1 further comprises a data processing unit 8 which is connected via links 9 and 10 to said cells 4 and 6, respectively.

Figure 3:
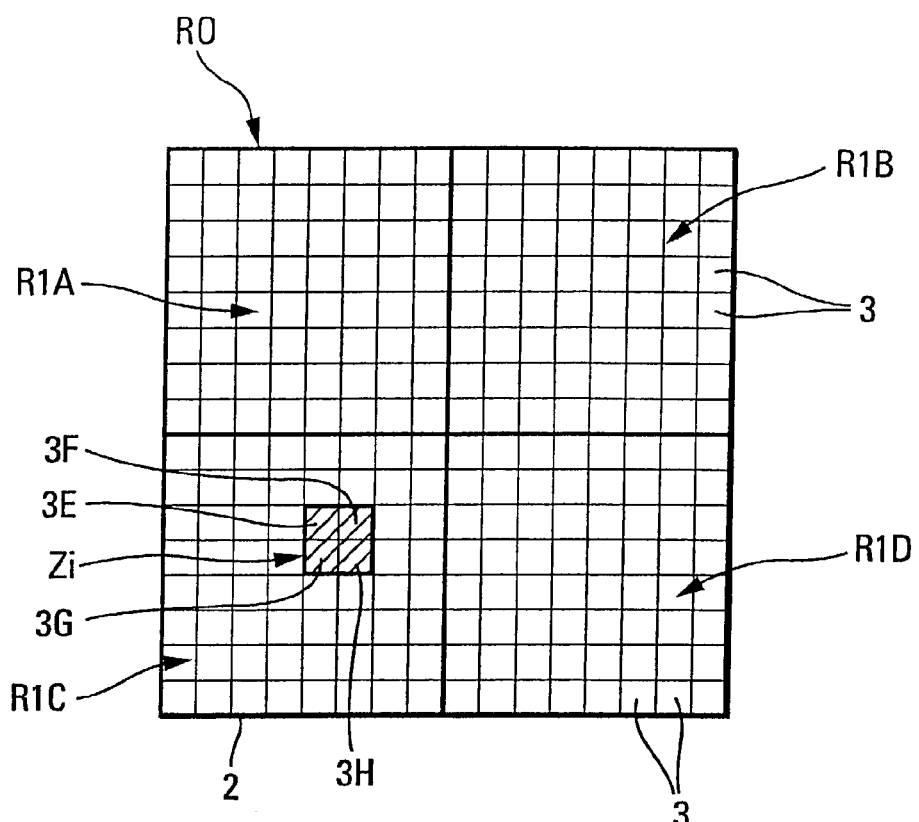
FIGS. 3 to 5 show a matrix of photosensors in three successive steps respectively, when implementing a method according to a first variant of the invention.

According to the method according to the invention, the object of which is to extract the illuminated zone Zi from the matrix 2 of photosensors 3, the following successive steps a) to c) are repeated, as shown for example in FIG. 3:

a) a matrix field R0 corresponding to said matrix 2 is divided into a plurality of search zones R1A, R1B, R1C, R1D which are such that, together, these search zones R1A, R1B, R1C, R1D cover said matrix field R0. In the variant embodiment of FIGS. 3 to 5, each matrix field is divided each time into four search zones of identical sizes;

b) said search zones R1A, R1B, R1C, R1D are analyzed one after another to search for the presence of an active photosensor 3E, 3F, 3G, 3H. According to the invention, the analysis of a search zone R1A, R1B, R1C, R1D consists, by means of a logic OR gate of the "global OR" type restricted to the corresponding search zone which is connected to all the photosensors 3 of this search zone, in collecting, one after another, the states of the set of these photosensors 3 of said search zone and in checking overall if one of said states is an active state. In the example of FIG. 3, using such an analysis, it is deduced that there is no active photosensor in the search zones R1A and R1B, but that at least one active photosensor 3E, 3F, 3G, 3H is located in the search zone R1C; and c) as soon as an active photosensor 3E, 3F, 3G, 3H is found on a particular search zone, in this case the search zone R1C, the search is stopped (consequently no search is carried out on the zone R1D) and this search zone R1C, the size and the position on the matrix 2 of which are known, is considered to be a new matrix field, for which the previous steps a), b) and c) are repeated.

According to the invention, said steps a) to c) are repeated until a matrix field comprising only active photosensors is obtained, this matrix field then corresponding to the illuminated zone Zi sought after, that is to say for extraction.

Figure 2:
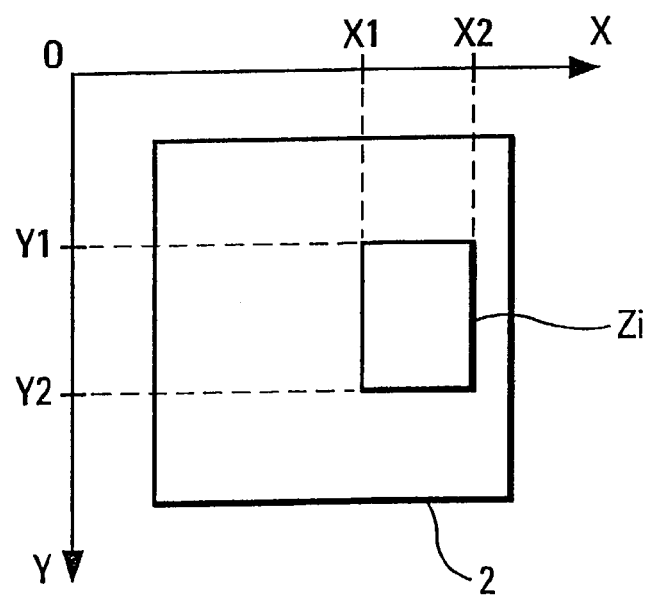
FIG. 2 is a graph highlighting the size and the position of a search zone on a matrix of photosensors of a light-detecting device according to the invention.

To find the size and the position on the matrix 2 of an illuminated zone Zi or of a search zone, its end positions X1 and X2 on an axis OX representing the columns and its end positions Y1 and Y2 on an axis OY representing the lines just have to be found, as illustrated in FIG. 2 for an illuminated zone Zi.

Figure 4:
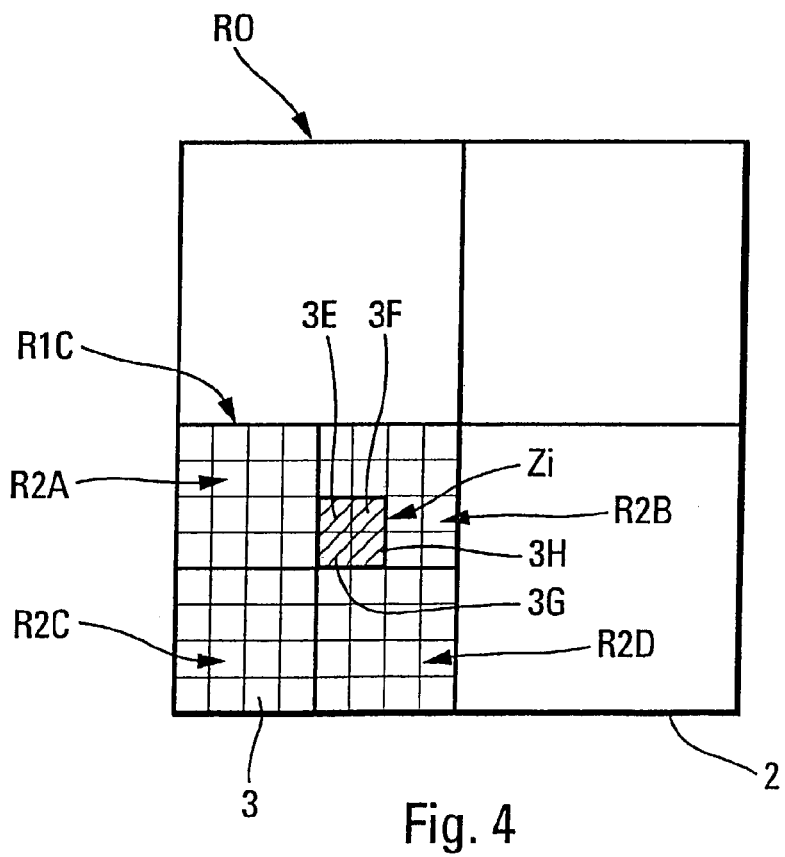
Figure 5:
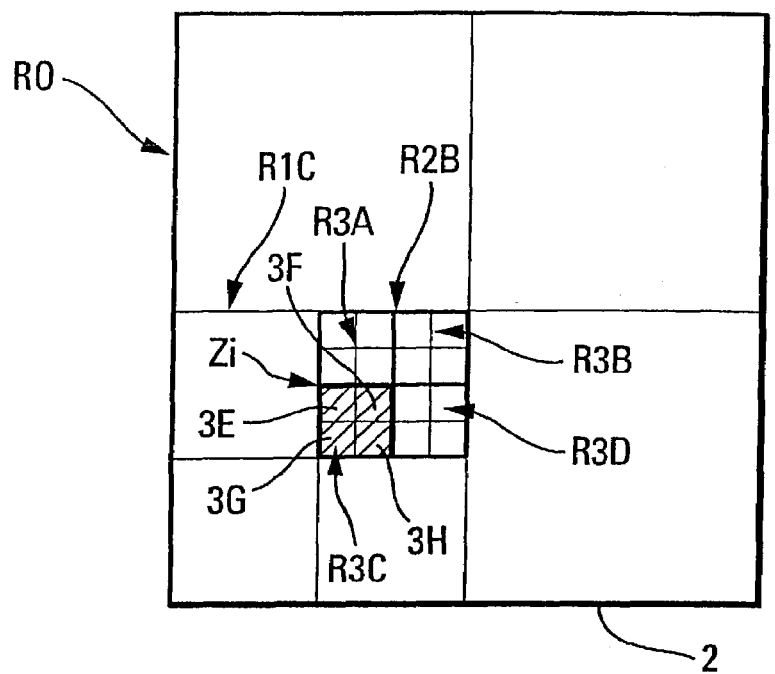

On adopting the variant of the method illustrated in FIGS. 3 to 5, starting from the new matrix field R1C, said steps a) to c) are again implemented, that is to say:

this matrix field R1C is divided into four search zones R2A, R2B, R2C and R2D, as shown in FIG. 4;

said search zones R2A, R2B, R2C and R2D are analyzed one after another in order to search for the presence of an active photosensor 3E, 3F, 3G, 3H; and no active photosensor is found in the zone R2A, but at least one active photosensor 3E, 3F, 3G, 3H is found in the search zone R2B. The latter is therefore considered as a new matrix field, which is again subjected to the aforementioned operations a) to c), as illustrated in FIG. 5.

To this end, this new matrix field R2B is divided into four search zones R3A, R3B, R3C and R3D. Analysis of the search zones R3A and R3B is unfruitful. On the other hand, analysis of the search zone R3C indicates the presence of the active photosensors 3E, 3F, 3G and 3H. Furthermore, this new matrix field R3C comprises only active photosensors 3E, 3F, 3G and 3H. Consequently, the sought-after illuminated zone Zi corresponds to this matrix field R3C.

Thus, by virtue of the invention, the illuminated zone Zi has been quickly extracted from the matrix 2 of photosensors 3.

Figure 6:
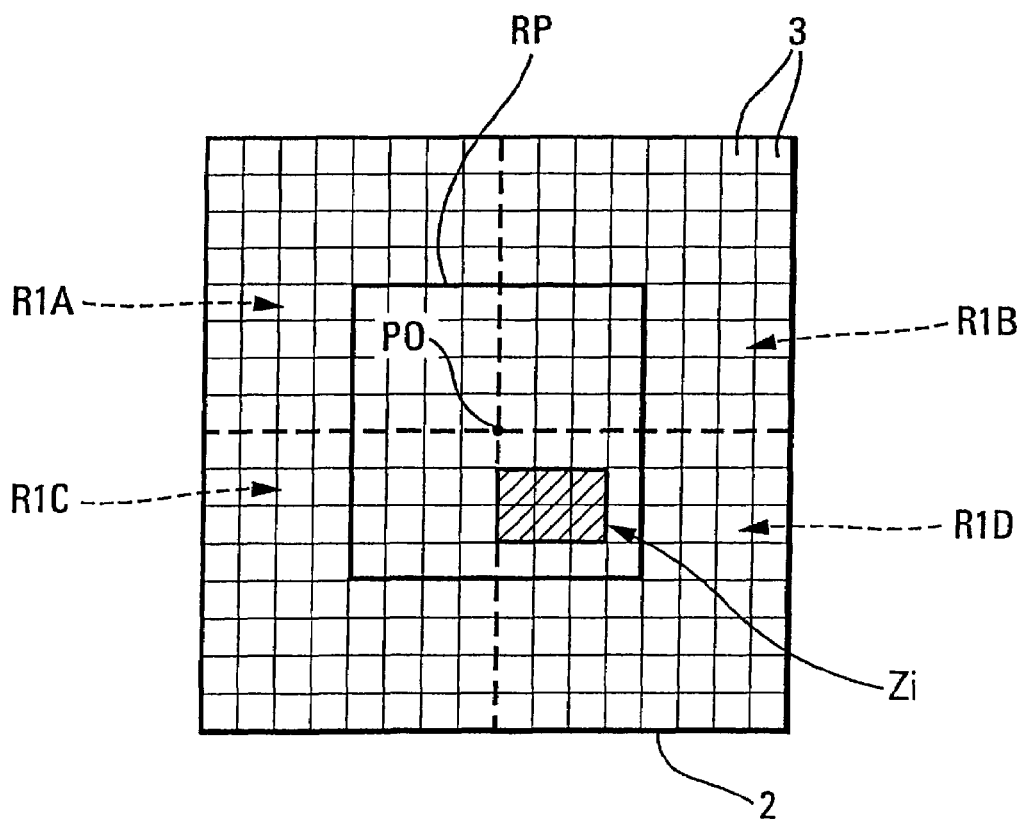
FIG. 6 shows schematically a matrix of photosensors illustrating a method according to a second variant of the invention.

In another variant embodiment shown in FIG. 6, on dividing the matrix field (that is to say the entire matrix 2 in FIG. 6), a priority search zone RP is formed each time, which zone is centered on an estimated position PO of the illuminated zone Zi and which is analyzed with priority over step b) according to the method according to the invention.

This variant embodiment makes it possible again to further accelerate implementing the method of extracting an illuminated zone according to the invention, where a reliable estimated position of the latter is available.

If, in this last embodiment, there is no active photosensor on the priority search zone RP, the search is continued on other search zones, for example search zones R1A, R1B, R1C and R1D.

What is claimed is:

1. A method for extracting an illuminated zone from a matrix of photosensors of a light-detecting device, said matrix comprising a plurality of photosensors which are arranged in rows and in columns and which are each able to take one of two states, an active state when illuminated and therefore activated and a passive state when not illuminated and therefore inactivated, said illuminated zone corresponding to a set of activated photosensors the method comprising repeating the following successive steps a) to c):

a) dividing a matrix field of said matrix of the light-detecting device into a plurality of search zones, which together cover said matrix field, said matrix field corresponding to the entire matrix during the first division;

b) analyzing said search zones one after another in order to search for the presence of an active photosensor, the analysis of a search zone comprising using an OR logic gate connected to all the photosensors of the search zone to collect the states of all these photosensors of said search zone and to check overall if one of said states is an active state; and c) stopping the search, as soon as an active photosensor is found in a particular search zone, and employing this search zone, the size and the position on said matrix of which is known, as a new matrix field that can be reused if necessary in a new step a), wherein said repetition of steps a) to c) is continued until a matrix field comprising only active photosensors is obtained, this matrix field, the size and the position on the matrix of which are known, then corresponding to said illuminated zone to be extracted.

2. The method as claimed in claim 1, wherein, in step a), a matrix field is divided into four search zones of identical sizes.

3. The method as claimed in claim 1, wherein, in step a), an estimated position of the illuminated zone is determined and a priority search zone is formed by dividing up the matrix field, which priority search zone is centered on this estimated position and which is then analyzed as a priority in step b).

4. The method of claim 3 wherein if there is no active photosensor in the priority search zone, the search is continued in other search zones.

5. The method as claimed in claim 1, wherein, a search zone being defined by its end positions on a first axis representing the columns, and by its end positions on a second axis representing the rows:

firstly, the steps a) to c) are repeated until obtaining the end positions of the illuminated zone on said first axis; and secondly, the steps a) to c) are repeated until obtaining the end positions of the illuminated zone on said second axis.

6. A light-detecting device, comprising a matrix of photosensors which are arranged in rows and in columns and which are each able to take one of two states, an active state when illuminated and an inactive state when not illuminated, which further comprises a row selection cell and a column selection cell which are associated with said matrix and which are able to extract an illuminated zone from said matrix by implementing the method specified in claim 1.

* * * * *